United States Patent
Igel

(10) Patent No.: US 6,369,435 B1
(45) Date of Patent: Apr. 9, 2002

(54) SEMICONDUCTOR COMPONENT

(75) Inventor: Günter Igel, Teningen (DE)

(73) Assignee: Micronas GmbH, Freiburg (DE)

( * ) Notice: Subject to any disclaimer, the term of this patent is extended or adjusted under 35 U.S.C. 154(b) by 0 days.

(21) Appl. No.: 09/440,913

(22) Filed: Nov. 16, 1999

(30) Foreign Application Priority Data

Nov. 17, 1998 (DE) .......................... 198 52 968

(51) Int. Cl.[7] .......................... H01L 29/84; H01L 29/96
(52) U.S. Cl. .................. 257/415; 257/417; 257/420; 257/723
(58) Field of Search .................. 257/415, 417, 257/420, 723

(56) References Cited

U.S. PATENT DOCUMENTS

| | | | | |
|---|---|---|---|---|
| 5,051,937 A | * | 9/1991 | Kawate et al. ............. | 702/104 |
| 5,412,992 A | * | 5/1995 | Tobita et al. ............... | 73/721 |
| 5,459,351 A | * | 10/1995 | Bender ....................... | 257/417 |
| 5,581,038 A | * | 12/1996 | Lampropoulos et al. ..... | 73/727 |
| 5,581,226 A | * | 12/1996 | Shah ........................... | 338/42 |
| 5,587,601 A | * | 12/1996 | Kurtz ........................ | 257/417 |
| 5,974,893 A | * | 11/1999 | Balcarek .................... | 73/714 |

FOREIGN PATENT DOCUMENTS

| | | | |
|---|---|---|---|
| EP | 0 809 966 A1 | 12/1997 | |
| WO | WO-98/40712 A1 | * 9/1998 | .............. G01L/9/00 |

OTHER PUBLICATIONS

P. Pons and G. Blasquez "Low–cost high–sensitivity integrated pressure and temperature sensor", *Sensors and Actuators—A Physical*, pp. 398–401 (1994).

Randy Frank, "Pressure sensors merge micromachining and microeltronoics" *Sensors and Actuators*, 28:93–103 (Jul. 1991).

* cited by examiner

*Primary Examiner*—Allan R. Wilson
(74) *Attorney, Agent, or Firm*—Akin, Gump, Strauss, Hauer & Feld, L.L.P.

(57) ABSTRACT

A semiconductor component (1) has a pressure sensor and a semiconductor chip (2) with a semiconductor structure (3) for at least one additional function of the semiconductor component (1). The semiconductor chip (2) is connected to a casing (5) by means of an elastic carrier arrangement (4) and can be deflected relative to the casing (5) against the restoring force of the material of the carrier arrangement (4) on the whole. For indirect measurement of a pressure acting on the semiconductor chip (2) and causing the deflection of the semiconductor chip (2), at least one position sensor that works together with the semiconductor chip (2) is provided.

14 Claims, 4 Drawing Sheets

SEMICONDUCTOR COMPONENT

BACKGROUND OF THE INVENTION

This invention concerns a semiconductor component with at least one pressure sensor and a semiconductor chip having a semiconductor structure for at least one additional function of the semiconductor component and with a casing attached to the semiconductor chip.

Such a semiconductor component is known from R. Frank, "Pressure sensors merge micromachining and microelectronics," *Sensors and Actuators*, A28(2), pp. 93–103 (1991). It has a semiconductor chip in whose substrate is etched a recess from the rear side, thus reducing the wall thickness of the semiconductor chip in some areas. Therefore, in the area of the recess, this yields a membrane of semiconductor material arranged in the surface plane of the semiconductor chip on the front flat side of the semiconductor chip, so that it can be deflected by a pressure acting against the restoring force of the semiconductor material. A measuring bridge arranged on the membrane has wire strain gauges to measure the bending deformation of the membrane caused by the acting pressure. The semiconductor chip also has a semiconductor structure for additional functions of the semiconductor component. This includes a circuit for temperature compensation of the pressure sensor and a microcomputer with a memory and an input/output interface for communication with an external computer.

The previously known semiconductor component has the disadvantage that a relatively large chip area must be reserved on the semiconductor chip for the membrane, thus increasing the cost of manufacturing the semiconductor component. Another disadvantage is that the membrane is under bending stress with the acting pressure, and the bending stresses are propagated into regions of the semiconductor chip near the membrane and can alter the electric properties of the semiconductor structure there. Thus, crystal planes in the structure may undergo mechanical deformation with the pressure acting on the membrane, for example, thus resulting in electric potentials in the semiconductor material which can alter the off-state voltage of pn junctions in the structure, for example. The additional function of the semiconductor chip can thus be impaired or disturbed. Another disadvantage of the semiconductor component is that the semiconductor chip must be masked and etched on the back side to produce the membrane, thus requiring an additional step.

SUMMARY OF THE INVENTION

Therefore, an object of the invention is to create a semiconductor component of the type described at the outset, avoiding any impairment of the additional function of the semiconductor component when a pressure acts on the pressure sensor. In addition, the semiconductor component should be inexpensive to manufacture.

This object is achieved in that the semiconductor chip is attached to the casing by an elastic carrier arrangement; the semiconductor chip on the whole can be deflected relative to the casing against the restoring force of the material of the carrier arrangement; and for indirect measurement of a pressure which acts on the semiconductor chip and produces a deflection, at least one position sensor that works together with the semiconductor chip is provided.

The semiconductor chip is thus deflected relative to the casing when pressure acts on it on the whole, thus preventing any change in its geometric dimensions. This avoids mechanical stress on the semiconductor chip and the development of bending stresses or tensile stresses and a related electric influence on the semiconductor structure provided for the additional function. Thus, the additional function can be executed with greater precision, while on the other hand the semiconductor component also has greater operational reliability, which permits its use in a larger temperature range, for example. Since this eliminates a membrane integrated into the semiconductor chip, it also results in a much smaller chip area, which permits inexpensive manufacture of the semiconductor chip. For example, the position sensor provided for indirect measurement of the pressure producing the deflection of the semiconductor chip may be an optical, inductive or magnetic sensor, preferably a non-contact sensor, which may optionally be integrated partially or completely into the semiconductor chip.

An especially advantageous embodiment of the invention provides for the position sensor to have a capacitor with at least two electrodes, one of which is a component of the semiconductor chip and the other is arranged on the casing. The capacitance of the capacitor is inversely proportional to the distance between the two electrodes. The deflection of the semiconductor chip depends on the spring characteristic of the carrier arrangement and may be in linear relationship to the pressure acting on the carrier arrangement and/or the semiconductor chip, for example. The capacitance is then inversely proportional to the pressure. The capacitive position measurement permits an especially simple design of the semiconductor component, where one of the capacitor electrodes may be formed by an electrically conducting area of the casing, for example, and the other capacitor electrode may be formed by an electrically conducting layer on the semiconductor chip and/or by the substrate of the semiconductor.

It is advantageous if the carrier arrangement has printed electric conductors for connecting terminal contacts arranged on the casing to terminal points on the semiconductor chip. The power supply voltage for the semiconductor chip, electric control signals and/or measurement signals can be transmitted easily between the semiconductor chip and the terminal contacts on the casing. The conductors may be printed on the carrier arrangement, for example, permitting inexpensive manufacture of the carrier arrangement. The capacitor electrode on the casing may optionally also be connected to the structure on the semiconductor chip, which may include a control and/or analysis device, by one of the printed conductors.

An especially advantageous embodiment of this invention provides for the printed conductors to be connected to the terminal points of the semiconductor chip and/or the terminal contacts of the casing by means of flip-chip technology. Bumps may be provided for electric contacting at the terminal points on the semiconductor chip and/or the printed conductors of the carrier arrangement. They may be soldered to mating contacts provided for them, for example, or connected by some other means. At the connecting points designed in the flip-chip technology, a plastic compound with conductive particles embedded in it may also be arranged between the printed conductors and the terminal points on the semiconductor chip or the terminal contacts of the casing, providing an electric connection between the printed conductors and the terminal points or terminal contacts. Bond wires between contact points to be joined can be eliminated by the flip-chip technology, thus greatly simplifying assembly of the semiconductor component.

A preferred embodiment of this invention provides for the carrier arrangement to have at least one substrate that carries the semiconductor chip and is elastically flexible against the restoring force of its material, for the substrate to be designed preferably as a bridge, with opposite end areas acting on the casing, and for the semiconductor chip to be fixedly connected to the substrate in the course between these two end areas. This yields a largely symmetrical carrier arrangement, which causes an approximately parallel displacement of the semiconductor chip and any capacitor electrode arranged on it, when acted upon by the pressure to be measured.

One embodiment of this invention provides for the substrate to be a film, in particular a plastic film. This may be made, for example, of polyimide, polyethylene or polyvinyl chloride. The film is applied to the casing, preferably on its peripheral edge, and is clamped there. The substrate is preferably arranged in the middle between opposite edge areas of the film acting on the casing, where it is fixedly bonded to the film.

It is advantageous if the substrate has a reduced material cross section at least in some of the intermediate area between the semiconductor chip and the casing. To that end, the substrate may have a wall area with perforations and/or a reduced thickness, for example. This yields a greater elasticity in some areas, so that low pressures can be measured better.

In an advantageous embodiment of this invention, the semiconductor chip has at least one structure designed as a sensor, with the substrate having at least one through-hole and the semiconductor chip with the sensor surface facing the through-hole attached to the substrate. The through-hole and the semiconductor chip then border a specimen container in which a medium to be tested can be arranged. To test this medium, the semiconductor chip may have, for example, a chemical, optical and/or magnetic sensor. A culture medium containing living biological cells may be arranged in the specimen container. The cells may optionally be adherent to the sensor surface of the semiconductor chip so that electric signals on the cells can be measured with the sensor. The specimen space bordered by the through-hole and the semiconductor chip may be connected to a pump for replacing the culture medium. Then the pressure induced by the pump in the specimen container, which can lead to changes in the electric signals by the biological cells, can be measured directly with the pressure sensor in the semiconductor component. The pressure in the specimen container may then optionally be taken into account in analysis of the signals measured on the cells.

A gasket surrounding the through-hole is preferably arranged between the substrate and the semiconductor chip, in particular between the active sensor surface and the terminal points of the semiconductor chip. A chemically aggressive medium in the specimen container formed by the through-hole can thus be kept away from the terminal points of the semiconductor chip. This prevents corrosion at the terminal points.

It is advantageous if a gap, in particular a capillary gap, is formed between the semiconductor chip and the substrate, and if a plastic potting compound is poured into this gap. The gap can then be filled with the plastic potting compound in a simple manner by the underfill technique during manufacture of the semiconductor component. The plastic potting compound is preferably added to the capillary gap from the side of the substrate facing the semiconductor chip to prevent contact between the plastic potting compound and the active sensor surface in the area of the through-hole.

An advantageous embodiment of this invention provides for the semiconductor chip to be arranged in a receptacle recess in the casing, and for the substrate to cover the opening of the receptacle recess and to be attached at its peripheral edge to the edge area of the casing bordering the receptacle recess. The receptacle recess may be formed, for example, by the cavity of a conventional standard-IC-casing, or it may be cut into a circuit board, preferably having multiple layers. It is even possible for the bottom of the receptacle recess to form a stop for the semiconductor chip on which the semiconductor chip is supported, its back side facing away from the active sensor surface, when there is a pressure in excess of the measurement range of the pressure sensor. The pressure sensor of the semiconductor component therefore has a high pressure strength. Furthermore, in the receptacle recess the semiconductor chip is also protected from mechanical damage.

It is especially advantageous if the elastic carrier arrangement and semiconductor chip form a replaceable sub-assembly, if there are pressure contacts connected to the printed electric conductors on the carrier arrangement, working together with the terminal contacts of the casing in the use position, and if clamping means are provided for securing the sub-assembly in the use position. The sub-assembly having the semiconductor chip with the pressure sensor and the active sensor surface can then be replaced easily in a laboratory, for example.

An especially advantageous embodiment of the invention provides for the casing to have an installation port for the sub-assembly, for the casing to be detachably connectable to the installation port with a connecting part having at least one inlet opening and one outlet opening for a medium to be tested, for the pressure contacts to be arranged on the back side of the substrate facing away from the connecting part when the sub-assembly is inserted into the installation port and to be supported there against the terminal contacts of the casing, and for the front side of the substrate facing the connecting part to be acted upon by pressure either directly or indirectly through a gasket surrounding the through-hole of the substrate. With the subassembly inserted into the receptacle recess of the casing part behind the installation port so that it is in use position, the connection part acts on one of the flat sides of the elastic substrate, preferably designed as a film, directly or indirectly by way of a gasket or the like, and the terminal contacts of the casing in the receptacle recess also act on the other flat side of the substrate.

The substrate is clamped between the connecting part and the casing having the receptacle recess, so that the pressure contacts of the substrate connected to the printed conductors are pressed by the restoring force of the elastic substrate material on the terminal contacts of the casing assigned to them. Due to the elasticity of the substrate material, the pressure contacts are pressed especially uniformly and with a constant pressure against the mating contacts. This yields a good long-term stability of the electric connections between the pressure contacts and the mating contacts. The connecting part having the inlet and outlet opening, connectable to the installation port of the casing may be part of a pump casing of a pump for supplying or circulating a medium to be tested.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings.

DETAILED DESCRIPTION OF THE INVENTION

Figure 1:
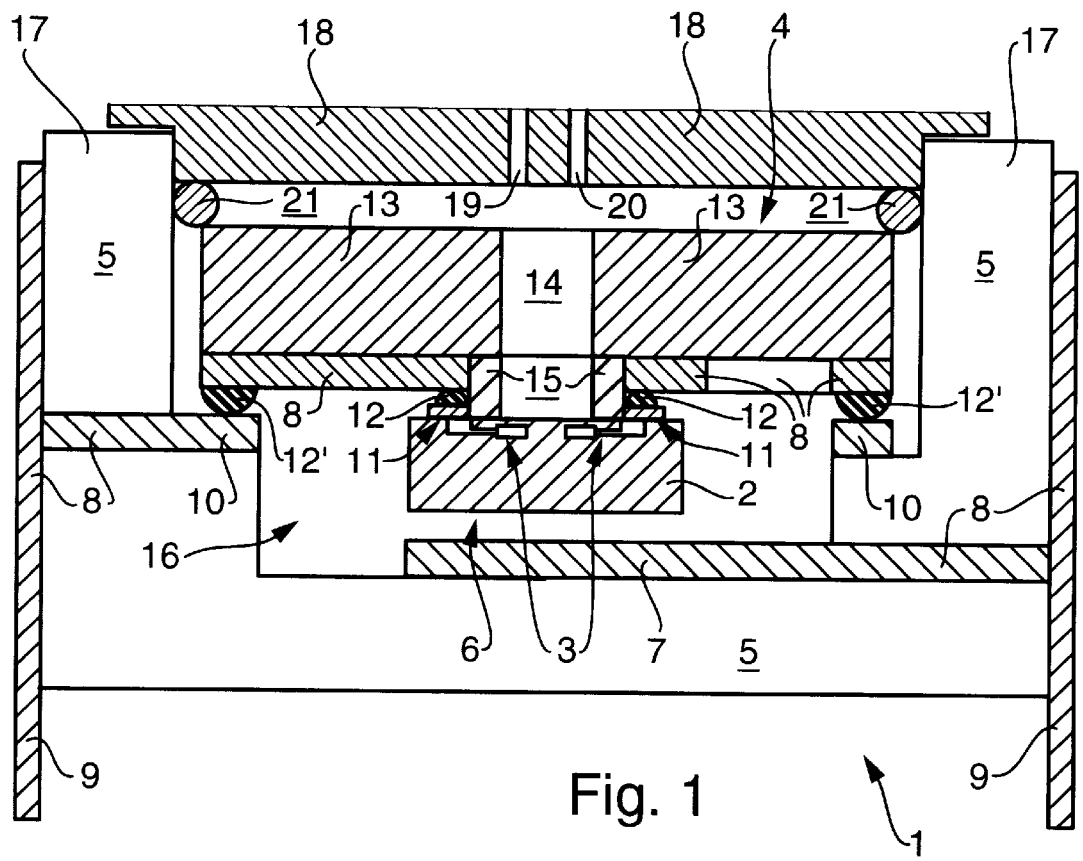
FIG. 1 is a cross-section through a semiconductor component having a pressure sensor and a semiconductor chip, where the semiconductor chip is arranged in a cavity of the casing so it can be moved relative to the casing of the semiconductor component on an elastically flexible substrate.

A semiconductor component, designated as a whole by 1, has a pressure sensor and a semiconductor chip 2. For an additional function of semiconductor component 1, semiconductor chip 2 has a semiconductor structure 3 with a surface-active sensor area. The structure may have areas consisting of doped or undoped semiconductor material, metal and/or electrically insulating material.

Semiconductor chip 2 is connected by an elastic carrier arrangement 4 to a casing 5, by means of which semiconductor chip 2 can be deflected relative to casing 5 against the restoring force of carrier arrangement 4 when acted upon by pressure. A pressure is understood to refer to both an excess pressure and a vacuum pressure.

For indirect measurement of a pressure acting on semiconductor chip 2 to produce a deflection, a position sensor that works together with semiconductor chip 2 is formed. It has a capacitor with two electrodes 6, 7, one electrode 6 being formed by the substrate of semiconductor chip 2 and the other electrode 7 being formed by an electrically conductive area arranged on a portion of casing 5 facing the rear flat side of semiconductor chip 2 which itself faces away from carrier arrangement 4. Electrodes 6, 7 can be moved toward and away from one another by elastic carrier arrangement 4, varying the distance between them. The capacitance of the capacitor is inversely proportional to the distance between the two electrodes 6, 7, while the deflection of semiconductor chip 2 has an approximately linear dependence on the pressure acting on semiconductor chip 2 and/or carrier arrangement 4. Therefore, the capacitance of the capacitor is in good approximation proportional to the pressure on the whole.

Electrodes 6, 7 of the capacitor are connected by printed electric conductors 8 to electric contacts 9 arranged on casing 5. Electric contacts 9 are designed as plug contacts and can be connected to a measurement and analysis unit, preferably set up outside of casing 5. It may have a display for the pressure acting on semiconductor chip 2 and/or carrier arrangement 4. The measurement and analysis unit may be, for example, a known capacitance meter.

Figure 2:
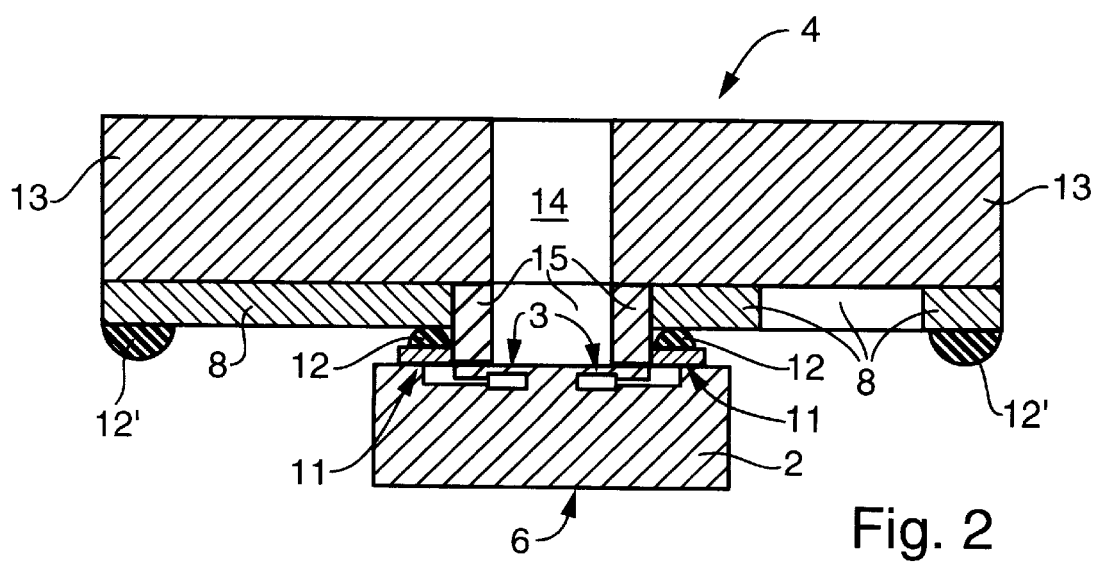
FIG. 2 is a cross-section through the sub-assembly shown in FIG. 1 with the substrate and the semiconductor chip in a representation enlarged in comparison to FIG. 1.
Figure 3:
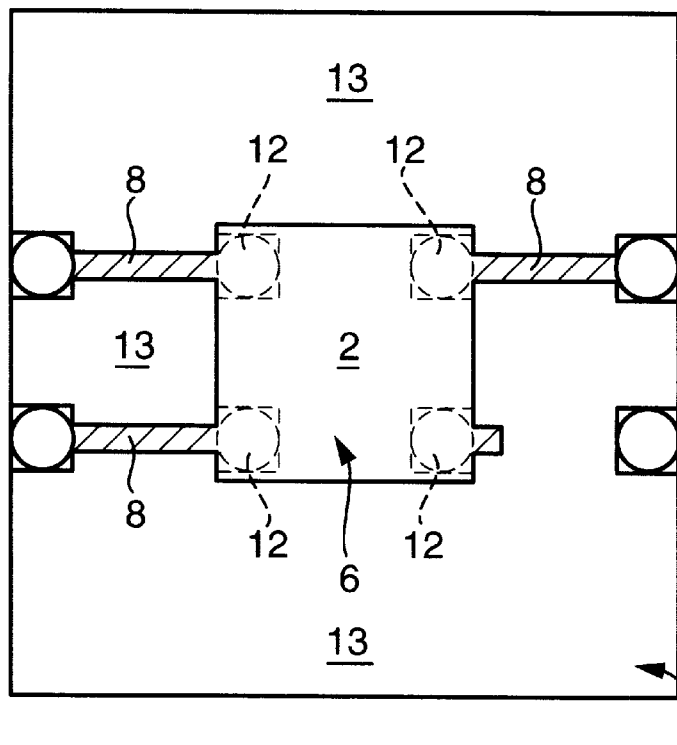
FIG. 3 is a bottom view of the sub-assembly shown in FIG. 2.
Figure 4:
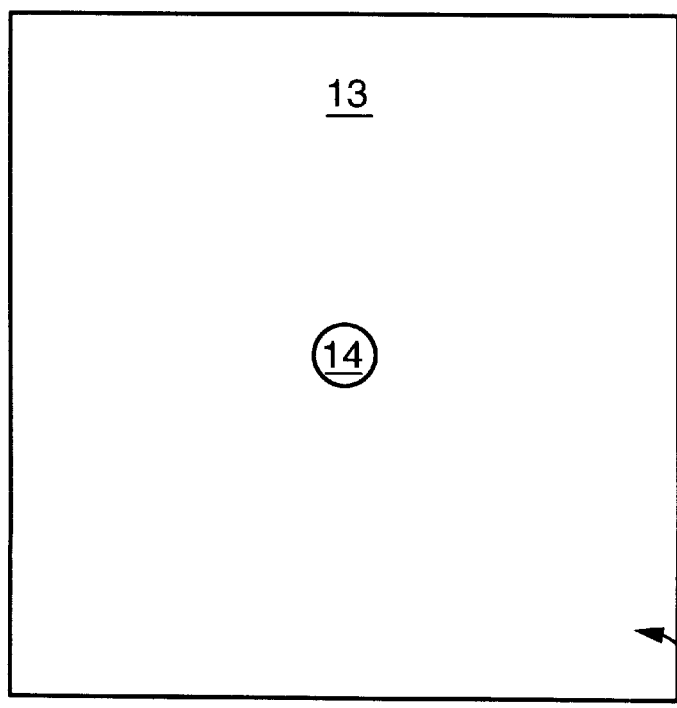
FIG. 4 is a top view of the sub-assembly shown in FIG. 2.

As shown especially well in FIGS. 2 and 3, elastic carrier arrangement 4 has printed electric conductors 8 on its back side facing semiconductor chip 2, connected to terminal points 11 of semiconductor chip 2 at terminal contacts 10 arranged on casing 5. As FIG. 1 shows, terminal contacts 10 are connected by means of printed conductors 8 arranged on casing 5 to the electric contacts 9 on the outside of casing 5. By means of printed conductors 8, semiconductor chip 2 may be connected to the measurement and analysis unit and/or a power supply unit. Printed conductors 8 may be printed on or otherwise applied to the casing 5 and/or the carrier arrangement 4 made of an electrically insulating material.

The terminal points 11 of the semiconductor chip 2 and the terminal contacts 10 of the casing 5 are connected to the printed conductors 8 of the carrier arrangement 4 by flip-chip technology. The terminal points 11 are arranged on the flat surface of the semiconductor chip 2 next to structure 3 and have bumps 12, for example, which project above the surface plane of the semiconductor chip 2 and act on a printed conductor 8 of the carrier arrangement 4 assigned to them. The bumps 12 may be soldered, glued, bonded by means of a plastic containing conductive particles, or otherwise fixedly connected to the printed conductors 8 of the carrier arrangement 4 assigned to them.

Bumps 12' are also provided on the end areas of the printed conductors 8 of the carrier arrangement 4 facing away from the terminal points 11 of the semiconductor chip and act on the terminal contacts 10 of the casing 5. Bumps 12' are designed as pressure contacts which are detachably connected to terminal contacts 10 of the casing. The electric connections, designed by flip-chip technology, between carrier arrangement 4 and semiconductor chip 2, on the one hand, and between carrier arrangement 4 and casing 5, on the other hand, permit simple and inexpensive assembly of semiconductor component 1.

Elastic carrier arrangement 4 has a substrate 13 which is designed as a film or membrane, for example, carries the semiconductor chip 2, and is elastically flexible against the restoring force of its material. Substrate 13 may be made of polyimide, polyethylene or polyvinyl chloride, for example. As shown especially well in the cross-sectional diagram in FIG. 1, substrate 13 acts like a bridge on casing 5 with end areas facing away from one another. Semiconductor chip 2 is arranged approximately in the middle between these end areas and is fixedly connected to the substrate 13.

Figure 1A:
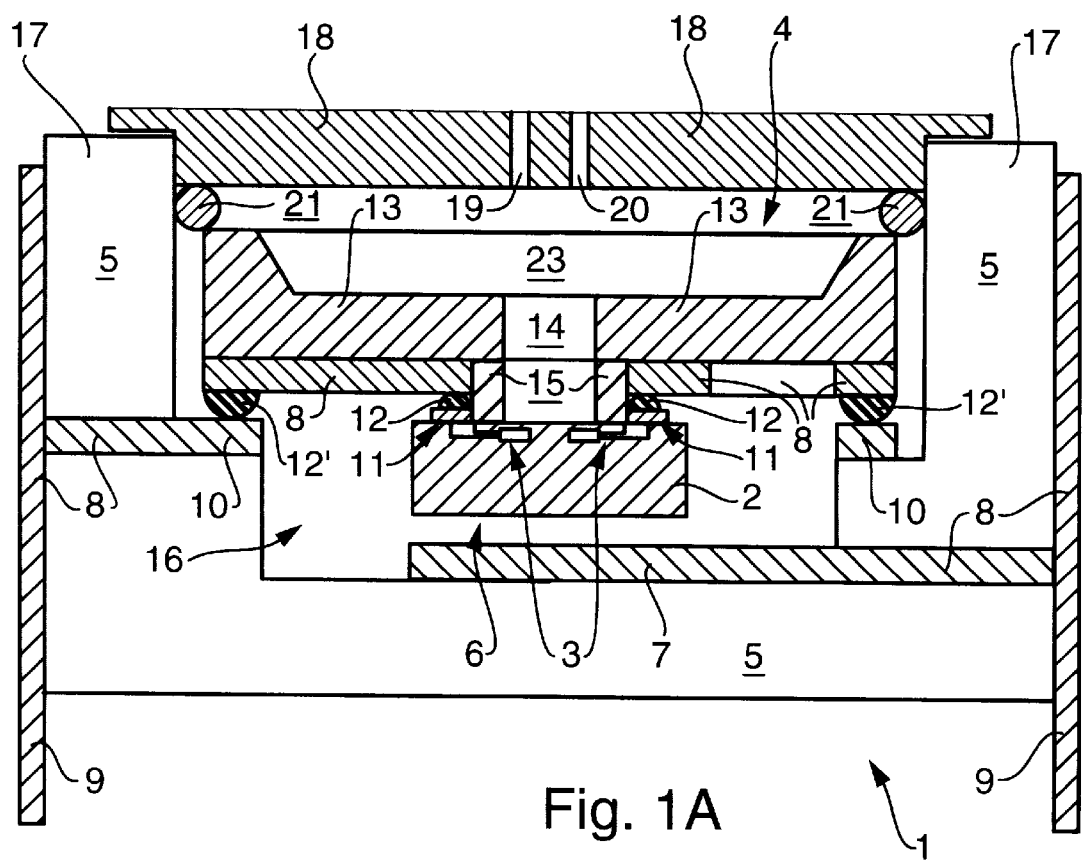
FIG. 1A is the semiconductor component with a reduced cross-section.

In an alternative embodiment according to FIG. 1A, the substrate 13 has a reduced cross-section 23.

The structure 3 having the active sensor surface for the additional functions of the semiconductor component 1 is arranged in an area of the flat side of semiconductor chip 2 forming the front side of the semiconductor chip 2 facing the substrate 13 in an area near the surface. Near to the active sensor surface of structure 3, substrate 13 has a through-hole 14 passing through substrate 13 across its plane of extent and connecting the rear side of the substrate 13 having the printed conductors 8 and facing the semiconductor chip 2 to the front side of the substrate facing away from it. As shown in FIG. 1, the semiconductor chip 2 with the active sensor surface of the structure 3 faces the through-hole 14 of the substrate 13 and covers it.

A gasket 15 is arranged between the semiconductor chip 2 and the substrate 13, contacting at one end area the edge of substrate 13 surrounding the through-hole 14 and at the opposite end area contacting the front side of the semiconductor chip between the active sensor surface of the structure 3 and the terminal points 11 of the semiconductor chip 2. Through-hole 14 of substrate 13, semiconductor chip 2 and gasket 15 surround a specimen space into which can be placed a liquid, gaseous or pasty medium, optionally containing particles, to be tested with semiconductor component 1. To test this medium, the semiconductor structure 3 of the semiconductor chip 2 may have at least one chemical sensor, such as an ion sensor, for example, or a sensor for measuring a gas content and/or at least one physical sensor, such as a conductivity sensor and/or an interdigital capacitor.

The medium to be tested may contain biological components, in particular living biological cells, which may optionally be deposited on the active sensor surface of the semiconductor chip 2 in order to test it by means of structure 3. Thus, for example, intracellular signals of the cells can be measured by semiconductor structure 3. In an advantageous manner, the pressure sensor integrated into semiconductor component 1 may at the same time also permit monitoring of the pressure in the medium. It has been found that certain physical cell characteristics, such as the cell potential, of biological cells contained in the medium can be influenced by the pressure in the medium. Thus, for example, pressure peaks in the medium containing the cells, which may be caused by a pump, for example, provided for pumping the medium, may lead to an unwanted change in the cell characteristics. The semiconductor component 1 according to this invention makes it possible to measure the pressure in the medium and optionally take it into account in analysis of the measured cell characteristics. Of course, however, the semiconductor component 1 may also be used in other applications, with simultaneous measurements of a pressure and at least one other physical, chemical and/or biological quantity being desired.

As shown in FIG. 1, substrate 5 of carrier arrangement 4 covers an opening of a receptacle recess 16 of the casing 5, in which the semiconductor chip 2 is arranged. In the undeflected position, the semiconductor chip 2 is at a distance from the casing walls bordering the receptacle recess 16 at the sides and at a distance from the bottom of the receptacle recess 16 having the electrode 7.

The elastic carrier arrangement 4 and the semiconductor chip 2 fixedly connected to it form a replaceable sub-assembly (FIG. 2). The bumps 12' arranged on the rear side of the substrate 13, facing the semiconductor chip 2 and connected to the printed conductors 8 arranged there, are therefore designed as pressure contacts which are in contact with the area of the casing 5 surrounding the receptacle 16 at the sides, when the sub-assembly is in the use position.

The receptacle 16 is arranged in an internal cavity in the casing 5 having an installation port for the sub-assembly. On the casing edge 17 bordering the installation port, casing 5 can be connected to the connecting part 18, having an inlet opening 19 and an outlet opening 20 for the medium to be tested on its inside wall facing the internal cavity of the casing part 5 in the use position. The inlet and/or outlet openings 19, 20 are connected by channels to the pump space of a pump.

In the use position, the substrate 13 of the sub-assembly is clamped between the connecting part 18 and the terminal contacts 10 of the casing 5 in the internal cavity of the casing 5. A ring gasket 21 surrounding the inlet and outlet openings 19, 20 is arranged between the substrate 13 and the connecting part 18, sealing the specimen space on the inside against the connection part 18 and the front side of the substrate 13 facing away from the semiconductor chip 2. The ring gasket 21 is arranged on the peripheral edge of the substrate 13, so that it can bulge away from connecting part 18 when there is an excess pressure in the specimen space and can bulge toward the connecting part 18 when there is a vacuum in the specimen space. Due to the elasticity of the substrate 13 clamped between the casing 5 and the connecting part 18, a good sealing effect of the ring gasket 21 is achieved on the one hand, while on the other hand, the bumps 12' on the back side of the substrate 13 are pressed uniformly against the terminal contacts 10 in the internal cavity of the casing 5.

Figure 5:
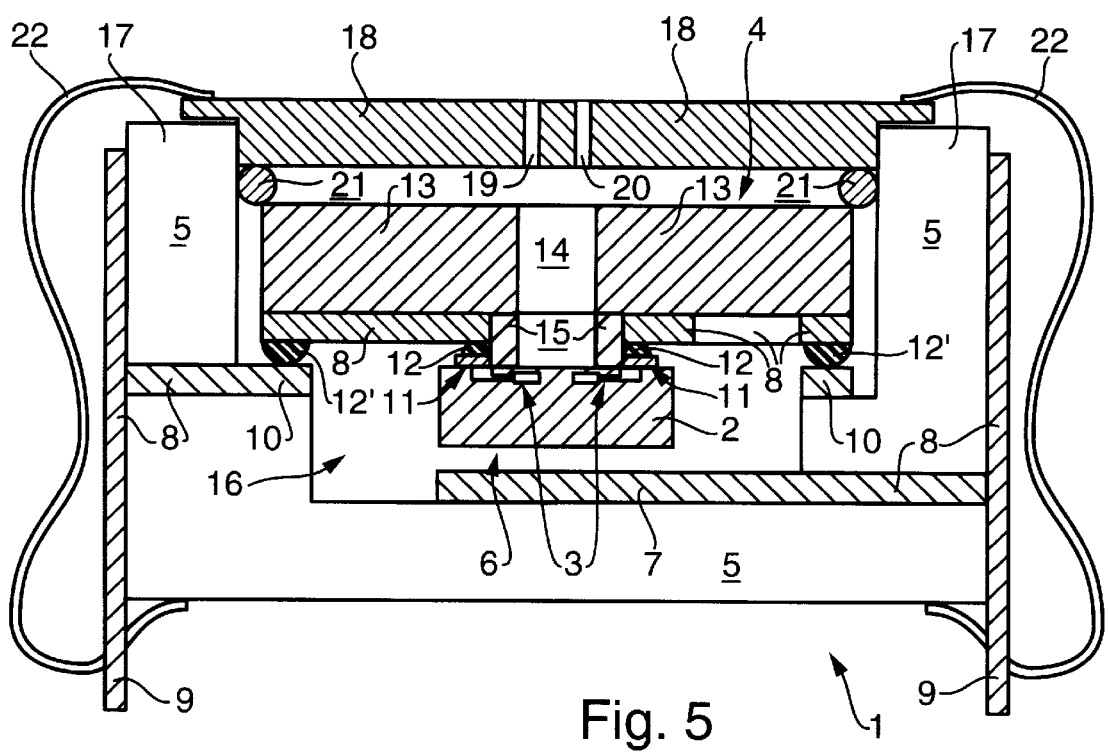
FIG. 5 is the semiconductor component with a clamp.

As shown in FIG. 5, for replacing the sub-assembly formed by the carrier arrangement 4 and the semiconductor chip 2, the connecting part 18 is detachably connected to the casing 5 by the clamps 22.

It should also be pointed out that when the allowed pressure is exceeded in the specimen space, the rear side of the semiconductor chip 2 touches the electrode 7 and is supported on the electrode 7 or the bottom of the casing 5. Semiconductor component 1 therefore has a high excess pressure strength. Optionally, when contacting electrodes 6, 7 by means of a measurement device, a current flow can be detected between electrodes 6, 7 and analyzed for controlling the pressure in the specimen space. In particular, a pump provided for pumping the medium in the specimen space can be turned off on contacting of electrodes 6, 7.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

I claim:

1. A semiconductor component (1) comprising at least one pressure sensor and one semiconductor chip (2), a semiconductor structure (3) for at least one additional function of the semiconductor component (1), and a casing (5) connected to the semiconductor chip (2), wherein the semiconductor chip (2) is connected to the casing (5) by an elastic carrier arrangement (4), the semiconductor chip (2) is deflectable as a whole against the restoring force of a material of the carrier arrangement (4) relative to the casing (5), and wherein at least one position sensor cooperating with the semiconductor chip (2) is provided for indirect measurement of a pressure causing deflection and acting on the semiconductor chip (2), wherein the carrier arrangement (4) has at least one substrate (13) which carries the semiconductor chip (2) and is elastically bendable against the restoring force of its material, and the substrate (13) is constructed as a bridge, with end areas facing away from one another acting on the casing (5), and the semiconductor chip (2) is fixedly connected to the substrate (13) in a course between these end areas, and wherein the semiconductor chip (2) has at least one semiconductor structure (3) designed as a sensor, having an active sensor surface on a flat side of the semiconductor chip (2), the substrate (13) has at least one through-hole (14), and the semiconductor chip (2) is connected to the substrate (13) with the sensor surface facing the through-hole (14).

2. The semiconductor component according to claim 1, wherein the position sensor has a capacitor with at least two electrodes (6, 7), one electrode (6) of which is part of the semiconductor chip, and a second electrode (7) of which is arranged on the casing (5).

3. The semiconductor component according to claim 1, wherein the carrier arrangement (4) has printed electric conductors (8) on its side facing the semiconductor chip (2) for connecting terminal contacts (10) arranged on the casing (5) to terminal points (11) on the semiconductor chip (2).

4. The semiconductor component according to claim 2, wherein the printed conductors (8) are connected by flip-chip technology to at least one of the terminal points (11) of the semiconductor chip (2) and the terminal contacts (10) of the casing (5).

5. The semiconductor component according to claim 1, wherein the substrate (13) is a film.

6. The semiconductor component according to claim 5, wherein the film is a plastic film.

7. The semiconductor component according to claim 1, wherein the substrate (13) has a reduced cross-section of material at least in some areas between the semiconductor chip (2) and the casing (5).

8. The semiconductor component according to claim 1, wherein a gasket (15) bordering the through-hole (14) is arranged between the substrate (13) and the semiconductor chip (2).

9. The semiconductor component according to claim 8, wherein the gasket is arranged between the active sensor surface and the terminal points (11) of the semiconductor chip (2).

10. The semiconductor component according to claim 1, wherein a gap is present between the semiconductor chip (2) and the substrate (13), and the gap is filled with a plastic potting compound.

11. The semiconductor component according to claim 10, wherein the gap is a capillary gap.

12. The semiconductor component according to claim 1, wherein the semiconductor chip (2) is arranged in a receptacle recess (16) in the casing (5), and the substrate (13) covers openings in the receptacle recess (16) and is connected at its peripheral edge to an edge area of the casing (5) surrounding the receptacle recess (16).

13. The semiconductor component according to claim 3, wherein the elastic carrier arrangement (4) and the semiconductor chip (2) form a replaceable sub-assembly, pressure contacts are provided on the carrier arrangement (4) connected to the printed electric conductors (8), cooperating with the terminal contacts (10) of the casing (5) in a use position, and clamps are provided for securing the sub-assembly in the use position.

14. The semiconductor component according to claim 13, wherein the casing (5) has an installation port for the sub-assembly; the casing (5) is detachably connected at the installation port with a connecting part (18) having at least one inlet opening (19) and one outlet opening (20) for a medium to be tested, the pressure contacts are arranged on a rear side of a substrate (13) facing away from the connecting part (18) when the sub-assembly is inserted into the installation port and are supported there against the terminal contacts (10) of the casing, and a front side of the substrate (13) facing the connecting part (18) is acted on by pressure from the connecting part (18) either directly or indirectly via a gasket (15) bordering a through-hole (14) of the substrate (13).

* * * * *